United States Patent

[11] 3,573,804

| [72] | Inventor | Claude H. Picou<br>Paris, France |
|---|---|---|
| [21] | Appl. No. | 604,211 |
| [22] | Filed | Dec. 23, 1966 |
| [45] | Patented | Apr. 6, 1971 |
| [73] | Assignee | Compagnie Generale de Geophysique<br>Paris, France |
| [32] | Priority | Jan. 10, 1966 |
| [33] | | France |
| [31] | | 45,297 |

[54] ANALOG-DIGITAL CONVERTER
4 Claims, 2 Drawing Figs.

| [52] | U.S. Cl. | 340/347 |
|---|---|---|
| [51] | Int. Cl. | H03k 13/02 |
| [50] | Field of Search | 340/347,<br>15; 328/149, 170; 179/15.5; 323/66; 330/109, 103 |

[56] References Cited
UNITED STATES PATENTS

| 2,967,292 | 1/1961 | Eisner | 340/347 |
|---|---|---|---|
| 3,127,601 | 3/1964 | Kaenel | 340/347 |
| 3,247,507 | 4/1966 | Moses | 340/347 |

Primary Examiner—Maynard R. Wilbur
Assistant Examiner—Charles D. Miller
Attorney—Waters, Roditi, Schwartz & Nissen ABSTRACT: An analog-digital converter has an input for an analog waveform and a reference voltage generator connected to a device for modifying the output of the generator in selected amplitude steps. A variable gain amplifier is arranged to receive both the analogue input and the modified reference voltage and is connected to a device for producing at repeated instants a digital signal corresponding to the difference between the instantaneous analog input and the modified reference voltage, and a further signal to the modifying device, should the difference be outside a predetermined range. The modifying device is responsive to the further signal to alter the reference voltage fed to the amplifier such that the difference is maintained within the predetermined range.

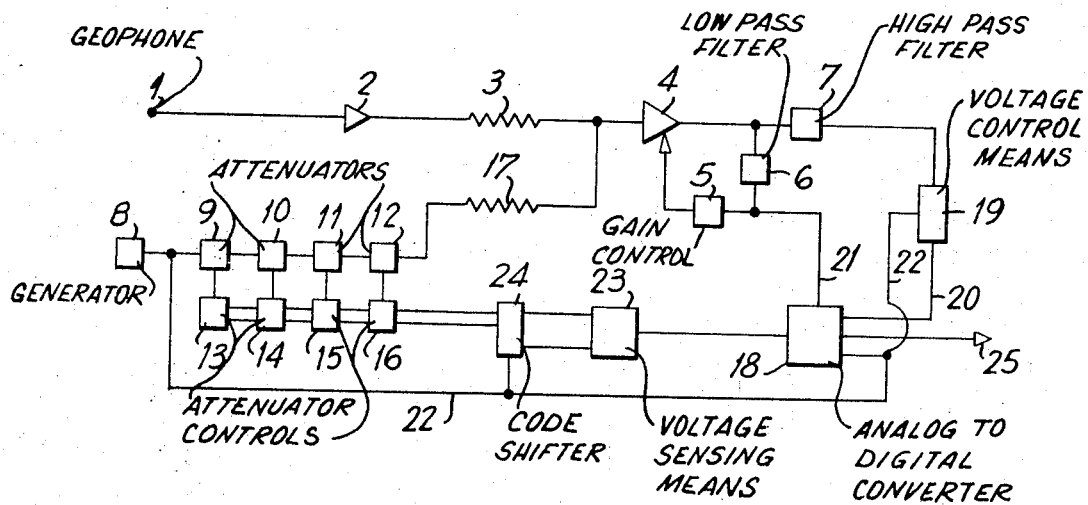

ANALOG-DIGITAL CONVERTER

The present invention refers to the coding of voltages varying with time such as those collected by the so-called geophones adapted to receive seismic vibrations produced either by a vibrator or by the detonation of an explosive charge.

The invention will be disclosed hereinafter with reference to its applications to the recording of seismic signals, but obviously it is also applicable to the recording of any signals, of which the dynamic range is very broad and is larger as mentioned hereinafter than the dynamic range of analog-digital converters adapted to be used for such a recording.

Hitherto, recording of an analog-type for instance recording on a magnetic tape or else the direct recording or the recording through frequency modulation or again through modulation of the width of pulses has been widely employed to.

However digital recording appears more advantageous since it allows in particular a higher accuracy. It is a well-known fact that digital recording consists in transforming at predetermined moments which are very near each other the instantaneous value of the signal supplied by the geophone into a numerical value which is more generally expressed for reason of convenience in the binary system. It is possible to resort for this purpose to an analog-digital converter, which is nowadays a well-known apparatus and which transforms the instantaneous value of the signal into a code, preferably for sake of convenience a code in the binary system.

It is furthermore a well-known fact that the operation executed by the analog to numerical converter consists chiefly in comparing the instantaneous sampled voltage with a reference voltage of which the value is accurately defined, the device delivering a digital signal corresponding to the difference between the sampled and reference voltages.

The following difficulty appears with such a method: the useful signals supplied by the geophone extend over a very broad dynamic range; in other words, the ratio between the minimum and maximum values produced by a geophone and which may be suitably resorted to may reach 120 to 140 decibels; now, analog to digital converters which may be bought can operate only within a narrower range and in particular the ratio between the full measuring range and the quantum is of a magnitude of 70 decibels, that is about one-half the above-mentioned FIG.

It is therefore necessary with a view to benefiting completely by the possibilities of operation of the geophones, to suitably modify during the recording procedure the amplitude of the signals which are to be compared in the converter.

This difficulty has already been removed by inserting between the geophones and the converter an amplifier of which the gain varies stepwise; the fact of passing from one stage to the next multiplies the gain by a predetermined factor for instance by 2 in the case where the code used is a binary code.

It is readily apparent that this multiplication or division of the gain by 2 consists in shifting in the binary code the point by one position, with reference to the numerical expression in said code of the voltage value recorded as supplied by the geophone. The operation is thus executed with a floating point, a well-known method in the technique of calculation.

In said known embodiment, the reference voltages are voltages corresponding to unvarying values and accurately stabilized by any suitable means such as Zener diodes. The modification in gain of the amplifier is controlled by the value of the output voltage of the analog to digital converter. If said output voltage rises above a predetermined threshold, suitable means reduce by one step the gain of the amplifier, in which case the point is shifted by one step.

The present invention has also for its object a different embodiment of a numerical recording which allows making use of the total extent of the dynamic range of signals supplied by the geophones.

According to the present invention there is provided an analog-digital converter comprising an input for an analog waveform, a reference voltage generator, means for modifying the output of said generator in selected amplitude steps, a variable gain amplifier arranged to receive both the analogue input and the modified reference voltage, and means connected to the output of said amplifier for producing at repeated instants a digital signal corresponding to the difference between the instantaneous analogue input and the modified reference voltage and a further signal for said modifying means should said difference be outside a predetermined range, said modifying means being responsive to said further signal to alter the reference voltage fed to said amplifier in such manner that the difference is maintained within said predetermined range.

In order to modify the value of the reference voltages, the output voltage of said generator is fed into the input of the amplifier inserted between the geophone and the converter through attenuators, which allow attenuation ratios varying to be obtained, each step differing from the preceding step by a factor 2 of the attenuating factor if a binary code is used. The latter condition is not essential although it will be assumed to be the case hereinafter for sake of simplicity.

It is thus apparent that in the embodiment according to the present invention the amplitude of the signals passing out of the geophone as received by the converter after amplification is not modified and only the value of the reference voltages supplied to the converter is modified.

Since the signals produced by the geophones and the signal produced by the generator, which latter serves for producing the reference voltages, pass through the same amplifier, it is obvious that the gain of said amplifier does not act on the accurate and correct value of the results supplied by the recording apparatus, provided only the amplifier shows the following properties:

Its gain should be linear and independent of the frequency within a range including the useful frequencies supplied by the geophones (from 10 to 200 cycles or thereabouts) and extending up to the frequency of the generator, which frequency is preferably for reasons to be given out hereinafter of a magnitude of several tens of kilocycles.

In other words, there is executed a sort of double weighing operation which allows, in particular, cutting out any errors due to the modifications of the amplifier gain during the recording.

The principle of the invention will first be disclosed with reference to a simplified embodiment wherein the recording is that of the voltage of a single geophone.

In the accompanying drawing:

FIG. 1 illustrates diagrammatically said embodiment; and

FIG. 2 illustrates diagrammatically a recording system associated with several geophones.

Turning to FIG. 1, 1 designates the geophone the voltage passing out of which is set into an amplifier 2 providing an unvarying gain while the output of said amplifier feeds, through a buffer resistance 3, an amplifier 4 having a variable gain. 5 designates the means controlling the gain of said amplifier 4, which controlling means are governed by the value of the output voltage of said amplifier 4. To this end, said output voltage is applied to the input of the control means 5 through a filter 6.

A generator 8 operating at a suitable frequency, for instance 25 kilocycles, feeds a series of attenuators for instance four attenuators 9, 10, 11, 12. The first attenuator produces for instance an attenuation of 48 decibels, the second attenuator one-half the first-mentioned attenuation, to wit: 24 decibels, the third attenuator an attenuation of 12 decibels and the fourth attenuator an attenuation of 6 decibels. Said attenuators may be respectively inserted in the circuit or cut off by means of suitable switching means which are respectively controlled by the members 13, 14, 15 and 16. The member 13 controls the attenuator 9, the member 14 controls the attenuator 10, the member 15 controls the attenuator 11 and the member 16 controls the attenuator 12. It is immediately apparent that depending on the orders supplied by 13, 14, 15, 16, the voltage at the output of the generator 8 is attenuated stepwise each time by 6 decibels. Since 16 stages may be provided, this leads to a total possible modification by 90 decibels. The voltage at the output of the attenuator 12 is applied to the input of the amplifier 4 under the same conditions as the output voltage of the amplifier 2 through a buffer resistance 17. The filter 6 is a low-pass filter preventing in particular the voltage passing out of the generator 8 through the resistance 17 from acting on the gain control means 5. Said gain control means 5 is preferably of a conventional type, the gain being adjusted as a function of the output level of the seismic signal, that is of the level of the signal at the output end of the filter 6. Said gain control means include chiefly a rectifying stage followed by a time constant circuit followed in its turn by an amplifier, the operation of such an arrangement being well-known in the art.

The voltage at the output of the filter 6, that is the amplified voltage produced by the geophone 1, excluding the voltage fed out of the generator 8 is applied to the input of an analog to digital converter illustrated at 18, as provided through a connection 21.

It will be noted that the sampling by the converter 18 being executed at a frequency $F$, the filter 6 is designed in accordance with conventional technique so as to attenuate as much as possible all the frequencies equal to or higher than half the frequency $F$, in order to cut out the drawbacks of the folding of the spectrum in conformity with Shannon's theorem.

The voltage at the output of the amplifier 4 passes also into a high pass or band pass filter 7 which stops the frequencies due to the geophone 1 and allows only those fed by the generator 8 to the amplifier 4 to pass.

The voltage at the output of the filter 7 feeds means 19 supplying the converter 18 through a connection 20 with the reference voltage with which the converter produces, if required, subdivided voltages, as provided for instance by means of a potentiometer.

To this end, means 19 measures the peak value of the alternating voltage of the wave supplied by the generator 8 as obtained across the output terminals of the filter 7 so as to supply the converter 18 with a constant voltage equal to said peak value throughout the useful period required for the comparing operation executed by the converter 18, that is substantially during one-quarter of the duration of the period of the wave supplied by the generator 8.

After this comparison, the voltage at the output of 19 is suddenly returned to zero, so that the means 19 are then ready for measuring a further value of the peak voltage. To this end, there is provided a direct synchronizing connection 22 between the generator 8 and said means 19. The latter may be constituted for instance by a condenser loaded with the interposition of a diode by the voltage at the output of the filter 7, the voltage across the terminals of said condenser becoming equal to the peak value after one-fourth of the period of the alternating voltage. Slightly before the end of each period of the wave supplied by the filter 7, a conventional flip-flop controlled by the output voltage of the filter 7 short circuits the condenser during a short time so that it may be discharged at the end of said period. The converter 18 compares, in a well-known manner, at predetermined moments the instantaneous voltage fed by 4 into the input of the lead 21 with the reference voltages supplied by the connection 20.

The sampling moment is defined by the generator 8 and to this end the connection 22 serves also for synchronizing the converter 18.

The digital output provided by the voltage supplied by the geophone is tapped through the connection 25 forming the output of the converter 18 and feeding a recording system operating on a magnetic tape. Said connection 25 includes as many leads as the converter includes bits or information units for instance 14 or 15 leads. A further output of the converter 18 feeds means 23 adapted to define if and at what moment the signal value supplied at the output of said converter 18 rises above a predetermined fraction of the reference voltage supplied through 20, for instance one-half said reference voltage. When this occurs, the means 23 send into the means 24 an order to shift back the point in the binary code by one step or if in contradistinction said value of the signal supplied by the converter drops underneath an also predetermined fraction of the reference voltage 20, for instance one-fourth of the latter, in such a case the means 23 send into the means 24 an order to shift the point forwards by one step by acting on the means 13 to 16 controlling the attenuators 9 to 12. However, the order-transmitting means should send out such orders only at predetermined moments of the periods of the current passing out of the generator 8. To this end, the connection 22 also connects the generator 8 with said order-transmitting means 24, the connection between 23 and 24 being illustrated by two lines, which should be construed as meaning that the means 23 acts on 24 in both directions, that is for shifting the point towards the left or towards the right-hand side through energization or deenergization of the attenuators 9 to 12. The control means 13 to 16 form in fact the successive flip-flops of binary forward and rearward counting means which receive from the order-transmitting means 24 either forward counting pulses making the point progress by as many steps or else backward counting pulses which make said point recede by as many steps.

FIG. 2 illustrates diagrammatically the wiring diagram of a recording system including a number of geophones. Generally, a series of geophones, say 24 geophones, is used at a time and these 24 geophones are generally associated with four auxiliary tracks, so that altogether 28 tracks are obtained. For the sake of simplicity, the diagram illustrated corresponds to a single track, the other tracks being arranged in parallel as mentioned hereinafter.

31 designates a geophone which is followed by a balancing circuit 32 through which it is possible, according to a well-known method, to balance the circuit and the result is that any parasitic induction is cut out completely or at least partly, which parasitic induction is produced by industrial or stray currents the frequencies of which are equal generally to 50 or 60 cycles/sec. The balancing means 32 are followed by a low pass filter 33 of which the slopes and frequency are adjustable. Said filter stops in the usual manner the voltages due to the ground roll, that is those due to the vibrations appearing in the upper layers of the ground. Such a filter 33 may be executed by means of passive or active elements and it feeds, through a booster transformer 34 having a well-defined transformation ratio, the input of a preliminary amplifier 35 with a constant gain stabilized by means for instance of a negative feedback of any suitable type. Said amplifier 35 corresponding to the amplifier 2 of FIG. 1 feeds a high pass filter 36 the slope and frequency of which are also adjustable. The object of said filter is to cut out of the signal all undesirable high frequency seismic noises.

There is thus obtained at the output of the filter 36 a filtered voltage with a well-defined constant amplitude ratio with reference to the voltage supplied by 31. The frequency band of the system 31, 36 starting from the geophone includes the usual seismic spectral band, ranging for instance between 2 and 300 cycles. The output of the filter 36 is connected through a buffer resistance 37 with the input of an amplifier with a variable gain and equivalent to the amplifier 4 of FIG. 1.

The amplifier illustrated includes three stages 38, 39 and 40 which stages are preferably identical. It is possible to use an amplifier of an operational type, each stage of which includes a negative feedback circuit with a very wide band.

Said negative feedback circuit is illustrated symbolically in each stage by resistances connecting its output with its input; 38' designates the resistance inserted between the input and the output of the stage 38 and its value defines the value of negative feedback in association with a resistance equivalent to the two input resistances 37 and 49. A resistance 39" is inserted between the output of 38 and the input of 39, whereas a resistance 39' inserted between the input and the output of 39 has a value defining in association with the value of the resistance 39'' the value of negative feedback of the stage 39.

Similarly, a resistance 40'' is inserted between the input of the stage 40 and the output of the stage 39 and a resistance 40' is inserted between the input and the output of the stage 40.

In order to allow a modification in the value of the negative feedback, the resistances 38', 39' 40' are variable and their values are adjusted simultaneously by the member 42. Said resistances 38', 39' and 40' are for instance photoelectric resistances the values of which depend on the illumination received or else they are constituted by transistors of the field effect type, wherein the resistance depends on the voltage applied to their gate electrodes. It is also possible to resort to variable resistances the operation of which is controlled by resorting to the Hall effect.

In the case of photoelectric resistances the member 42 illuminates the resistances while in the case of transistors of the field effect type, the member 42 adjusts the voltage at their gates. The member 42 corresponds to the control means 5 of FIG. 1. The voltage controlling said member 42 is tapped off the output of the stage 40 through the filter 41 corresponding to the filter 6 of FIG. 1; said filter 41 allows only the geophone signals to pass and excludes those produced by the local generator 60 forming the single generator provided for all the tracks. The generator 60 feeds through the attenuators 45, 46, 47, 48 which correspond to attenuators 9 to 12 (FIG. 1) and the resistance 49 the amplifier 38–39–40. A filter 44 is inserted between the output of the last amplifier stage 40 and the input of the multiplexing means 62 to be described hereinafter. Said filter 44 corresponds to the filter 7 of FIG. 1 and it affords a passage only for the signals produced by the generator 60 and excludes the signals passing out of the geophones. The output of the last attenuator 48 is connected with the input of the first amplifier stage 38 through a buffer resistance 49. The attenuators 45 to 48 are controlled by the means 55, 56, 57, 58 which produce their energization and deenergization through incorporated switching means. These are as many parts 31 to 58 as there are geophones, for instance there are 24 series of such parts. In contradistinction, the generator 60 is the single generator and the parts 61, 62, 63, 64, 66, 69, 70 described hereinafter are also common to all the tracks.

The voltage at the output of the filter 41 is fed to an electronic switch or multiplexing means 61 which include therefore as many inputs as there are tracks, i.e. 28 inputs. Similarly, the voltage at the output of the filter 44 is applied to the input of the further above-mentioned electronic switch or multiplexing means 62 which also includes as many input channels are there as recording tracks, that is 28 input channels. The part to be played by the switches 61 and 62 consists in feeding the converter 66 sequentially with the voltage from filters 41 and 44 synchronized by the voltage from the generator 60. The voltages thus selected sequentially are fed to corresponding means 63 and 64 inserted at the output of the switches 61 and 62 respectively.

Means 64 correspond to the means 19 of FIG. 1 and operate in the same manner.

Preferably, the filter 44 is a band-pass filter. The member 42 is of a known type incorporated with all automatic analog gain control means. It includes a detector of the input voltage passing out of the filter 41, a stage for comparison with a constant reference voltage, a circuit providing one or two time constants corresponding to expansion and compression and an output amplifier.

According to a preferred feature of the invention, the multiplexing means 61 and 62 are synchronized by the waves produced by the generator 60, as provided by the connection 65.

It is readily apparent that in the case of 28 tracks and taking as a sampling frequency 1,000 cycles/sec., it is necessary to resort to a generator 60 the frequency of which is equal to 28×1,000 that is 28 kilocycles. The means 63 fed by 61 and constituted by locking and sampling means well-known in the art are connected at the front end with the input of an analog to digital converter 66. The latter also receives the reference voltages passing out of the multiplexing means 62 through the connection 67.

68 designates the output connections of the converter, which connections feed the recording apparatus. There are as many parallel connections 68 as there are information bits supplied by the converter, usually 12 to 15.

The converter operates preferably but not exclusively in conformity with a binary code and includes for instance 14 bits and consequently the total measuring scale is equal to $2^{15}-1$ times the measuring quantum, which corresponds to a ratio of 90 decibels.

As already mentioned, the generator 60 is stabilized as to amplitude and it is known that such a stabilization to an extent at least equal to $10^{14}$ may be executed over a duration of a magnitude of 10 seconds corresponding to the duration required for recording a seismic firing. The switching means incorporated with the attenuators 45 to 48 are controlled by the members 55 to 58 which provide for their energizing operation or deenergizing operation and they are preferably constituted by quick-action relays controlling a dry contact or a mercury wetted contact; the duration of their operation is selected within a magnitude of one-half millisecond or even less.

It is immediately apparent that the resistances 37 and 49 feeding in parallel the input of the amplifier 38 form a circuit adder or a circuit combining linearly the voltages at the output of the filter 36 on the one hand and of the attenuator 48 on the other hand.

The means illustrated at 69 act on the switch 70 connected with the member 58 and shift the point as already mentioned in one direction when the output value of the binary signal extends beyond one-half the scale and it acts in the opposite direction when said output value drops underneath one-fourth of the maximum value given out by the scale. Obviously, it is possible to resort to fractions other than one-half or one-fourth for the maximum or peak value and for the minimum or threshold value. To this end, the input means 69 is connected with the last two output leads of the converter 66, that is with the leads transmitting the most important digits to the recording means.

Consequently, if the lead transmitting the most important or first digit transmits the value 1, whereas said value was previously zero, this means that the signal voltage increases and it is therefore necessary to reduce the attenuation to which the reference signal has been subjected and consequently the means 69 shifts the point towards the right-hand side of the record.

If, in contradistinction, the two leads transmitting the two most important digits both produce a signal of a zero value, this means that the value transmitted by the geophone has become weaker and it is therefore necessary, in such a case, to increase the attenuation of the reference signal and the means 69 then shifts the point towards the left-hand side.

It should be remarked that a connection which is not illustrated leading to the recording means allows recording the position for each track and during each sampling, of the switch controlling members 55 to 58, so as to allow ascertaining for each track and at any moment the position of the point.

According to a modified embodiment, the generator 60 produces no longer an alternating voltage at a frequency of 28 kilocycles, but, on the one hand, pulses the frequency of repetition of which is equal to 28 kilocycles which impulses serve as hereinabove for synchronizing the different parts such as the multiplexing means 61, 62 and 70, the converter 66 and the sampling and locking means 63 and 64. And, on the other hand, an alternating voltage at a frequency of 2, 4 or 7 kilocycles but preferably 2 kilocycles which is obtained by filtering a square-shaped wave which is obtained in its turn by the subdivision by 14, 7 or 4 of the frequency of repetition of the pulses i.e. a frequency of 28 kilocycles.

This alternating voltage is sent into the attenuators 45 to 48 and serves for producing the reference voltage. Said modification shows the advantage of reducing the passing band of the amplifiers.

For such an embodiment, it is furthermore essential for the phase of the voltage at a frequency of 2 kilocycles in each channel to be suitably adjusted so that the moment of the sampling operation through the means 64 corresponding to the means 19 in FIG. 1 may register with a peak of the reference signal at a frequency of 2 kilocycles. In order to obtain such a result, suitable adjustable phase-shifting means are provided according to the modification which is being disclosed at the output end of the attenuators. In contradistinction, in said modification the converter feeding means 64 is of a conventional type.

According to a further embodiment, the negative feedback of the three amplifying stages 38, 39 and 40 have unvarying values and variable attenuators are inserted between said stages, their attenuation values being controlled by the automatic gain control so as to produce an automatic gain control.

I claim:

1. An analog-digital converting system comprising: an input for an analog waveform; a reference voltage generator which generates a reference sine-wave voltage having stable amplitude and stable frequency, said frequency defining the repeated instants of conversion; modifying means for modifying said amplitude of said reference sine-wave voltage in selected amplitude steps; a variable gain amplifier arranged to receive both said analogue input and modified reference sine wave voltage and to provide at its output these two signals amplified in the same manner; filtering means for separating the amplified analog input voltage from the amplified modified reference sine wave voltage, respectively; said amplified analog input voltage controlling the gain of said variable gain amplifier; means for providing, from the peak values of said amplified modified reference sine wave voltage, repetitive constant reference voltages, which are related to said peak values; an elementary converter arranged to receive the separated amplified analog input voltage and said repetitive constant reference voltage to convert said separated amplified analog input voltage into an output digital signal; control means arranged to actuate said modifying means should said output digital signal tend to be outside a predetermined range, whereby said input analog waveform may be converted into said output digital signal in a substantially wider conversion range than the conversion range of said elementary converter.

2. An analog-digital conversion system as claimed in claim 1, in which said modifying means comprises attenuators arranged in succession and selectively operable to modify said reference sine wave voltage.

3. A converter as claimed in claim 1, wherein the ratio between successive attenuating steps is equal to two.

4. A converter as claimed in claim 3, wherein said predetermined range is one-fourth to one-half of the modified reference voltage.